United States Patent
Hendry et al.

(10) Patent No.: US 12,348,751 B2
(45) Date of Patent: Jul. 1, 2025

(54) METHOD AND APPARATUS FOR SIGNALING IMAGE INFORMATION

(71) Applicant: LG ELECTRONICS INC., Seoul (KR)

(72) Inventors: Hendry Hendry, Seoul (KR); Seethal Paluri, Seoul (KR); Seunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 17/779,914

(22) PCT Filed: Nov. 26, 2020

(86) PCT No.: PCT/KR2020/016961
§ 371 (c)(1),
(2) Date: May 25, 2022

(87) PCT Pub. No.: WO2021/107637
PCT Pub. Date: Jun. 3, 2021

(65) Prior Publication Data
US 2023/0020666 A1    Jan. 19, 2023

Related U.S. Application Data

(60) Provisional application No. 62/941,664, filed on Nov. 27, 2019.

(51) Int. Cl.
*H04N 19/46* (2014.01)
*H04N 19/119* (2014.01)
(Continued)

(52) U.S. Cl.
CPC ........... *H04N 19/46* (2014.11); *H04N 19/119* (2014.11); *H04N 19/172* (2014.11); *H04N 19/174* (2014.11)

(58) Field of Classification Search
CPC .... H04N 19/46; H04N 19/119; H04N 19/172; H04N 19/174
(Continued)

(56) References Cited

U.S. PATENT DOCUMENTS

2022/0217383 A1* 7/2022 Wang ..................... H04N 19/70
2022/0394301 A1* 12/2022 Deshpande .......... H04N 19/172

FOREIGN PATENT DOCUMENTS

| KR | 1020180033030 | 4/2018 |
| KR | 1020190015440 | 2/2019 |

OTHER PUBLICATIONS

Benjamin et al., Versatile Video Coding (Draft 6). JVET-O2001-vE. Joint Video Experts Team (JVET) of ITU-T SG 16 WP 3 and ISO /IEC JTC 1/SC 29/WG 11 15th Meeting: Gothenburg, SE. pp. 1-441. Sep. 24, 2019. (Year: 2019).*

(Continued)

*Primary Examiner* — On S Mung
(74) *Attorney, Agent, or Firm* — Bryan Cave Leighton Paisner LLP

(57) ABSTRACT

A method by which a decoding device decodes an image, according the present disclosure, comprises a flag related to whether there is sub-picture information and a flag related to whether a sub-picture includes a single slice, wherein the flag related to whether there is sub-picture information corresponds to a value of 0, and the flag related to whether the sub-picture includes the single slice corresponds to a value of 1.

3 Claims, 14 Drawing Sheets

(51) Int. Cl.
*H04N 19/172* (2014.01)
*H04N 19/174* (2014.01)

(58) Field of Classification Search
USPC .................................................. 375/240.26
See application file for complete search history.

(56) References Cited

OTHER PUBLICATIONS

Benjamin Bross, Jianle Chen, Shan Liu, Ye-Kui Wang, Versatile Video Coding "Draft 7", Joint Video Experts Team (JVET) of ITU-T SG 16 WP 3 and ISO/IEC JTC 1/SC 29/WG 11, 16th Meeting: Geneva, CH, Oct. 1-11, 2019 (Year: 2019).*

Bross, Benjamin et al., Versatile Video Coding (Draft 6), JVET-O2001-vE, Joint Video Experts Team (JVET) of ITU-T SG 16 WP 3 and ISO/IEC JTC I/SC 29/WG 11 15th Meeting, Gothenburg, SE, pp. 1-441, Sep. 24, 2019, see pp. 41, 100 and 102.

Paluri, Seethal et al., AHG12 Explicit Signaling of Uniform and Non-Uniform Subpicture Grid in the SPS, JVET-P0471, Joint Video Experts Team (JVET) of ITU-T SG 16 WP 3 and ISO/IEC JTC I/SC 29/WG 11 16th Meeting, Geneva, CH, pp. 1-8, Sep. 25, 2019, see p. 2.

Hannuksela, Miska M. et al., AHG12, single_slice_per_subpic_flag, JVET-P1024, Joint Video Experts Team (JVET) of ITU-T SG 16 WP 3 and ISO/IEC JTC 1/SC 29/WG 11 16th Meeting, Geneva, CH, p. 1, Oct. 9, 2019, see p. 1.

* cited by examiner

FIG. 5
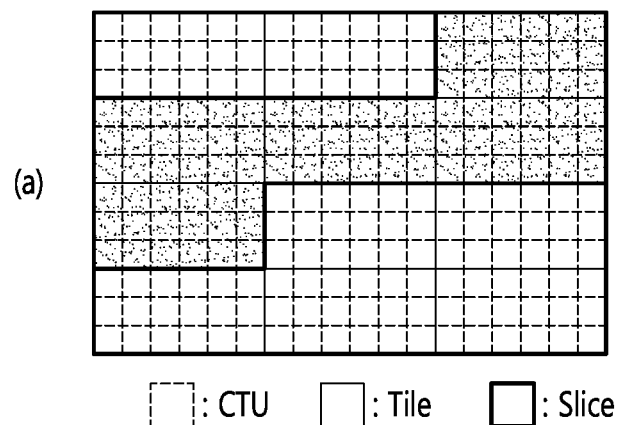
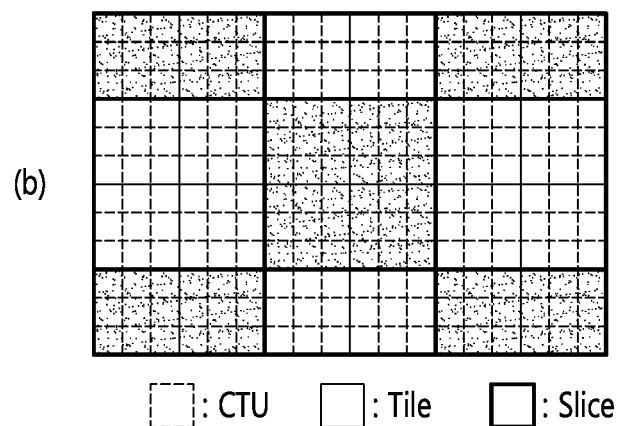
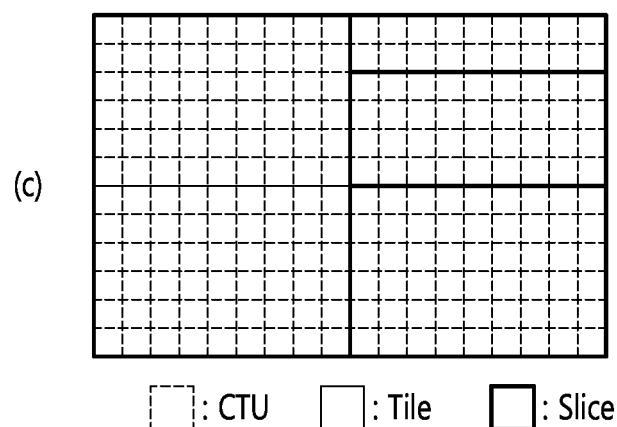

METHOD AND APPARATUS FOR SIGNALING IMAGE INFORMATION

This application is the National Stage filing under 35 U.S.C. 371 of International Application No. PCT/KR2020/016961 filed on Nov. 26, 2020, which claims priority to U.S. Provisional Application No. 62/941,664 filed on Nov. 27, 2019, the contents of which are all hereby incorporated by reference herein in their entirety.

BACKGROUND OF THE DISCLOSURE

Field of the Disclosure

The present disclosure relates to an image decoding method and an apparatus therefor.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line and image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

The present disclosure provides a method and apparatus for improving image coding efficiency.

The present disclosure also provides a method and apparatus for signaling partitioning information of a picture.

The present disclosure also provides a method and apparatus for decoding a current picture based on partitioning information of the current picture.

In an aspect, an image decoding method performed by a decoding apparatus is provided. The method includes: obtaining image information including partitioning information on a current picture from a bitstream; deriving at least one slice included in the current picture based on the partitioning information; and reconstructing the current picture based on the at least one slice, wherein the image information includes a first flag related to the presence of subpicture information and a second flag related to whether each subpicture in the current picture includes only one slice, and wherein a value of the first flag is equal to 0 and a value of the second flag is equal to 1.

In another aspect, an image encoding method performed by an encoding apparatus is provided. The method includes: partitioning a current picture into at least one slice; generating partitioning information of the current picture based on the at least one slice; and encoding image information for the current picture including the partitioning information, wherein the image information includes a first flag related to the presence of subpicture information and a second flag related to whether each subpicture in the current picture includes only one slice, and wherein a value of the first flag corresponds to zero and a value of the second flag corresponds to 1.

In still another aspect, a non-transitory computer-readable storage medium storing a bitstream including image information causing an image decoding method to be performed is provided. The image decoding method includes: obtaining image information including partitioning information for a current picture from a bitstream; deriving at least one slice included in the current picture based on the partitioning information; and reconstructing the current picture based on the at least one slice, wherein the image information includes a first flag related to the presence of subpicture information and a second flag related to whether each subpicture in the current picture includes only one slice, and wherein a value of the first flag is equal to 0 and a value of the second flag is equal to 1.

Advantageous Effects

According to the present disclosure, overall image/video compression efficiency may be improved.

According to the present disclosure, efficiency of partitioning may be improved.

According to the present disclosure, efficiency of partitioning may be improved based on partitioning information for a current picture.

BRIEF DESCRIPTION OF THE DRAWINGS

FIG. 5 is a diagram illustrating an example of partitioning a picture.

DESCRIPTION OF EXEMPLARY EMBODIMENTS

Figure 1:
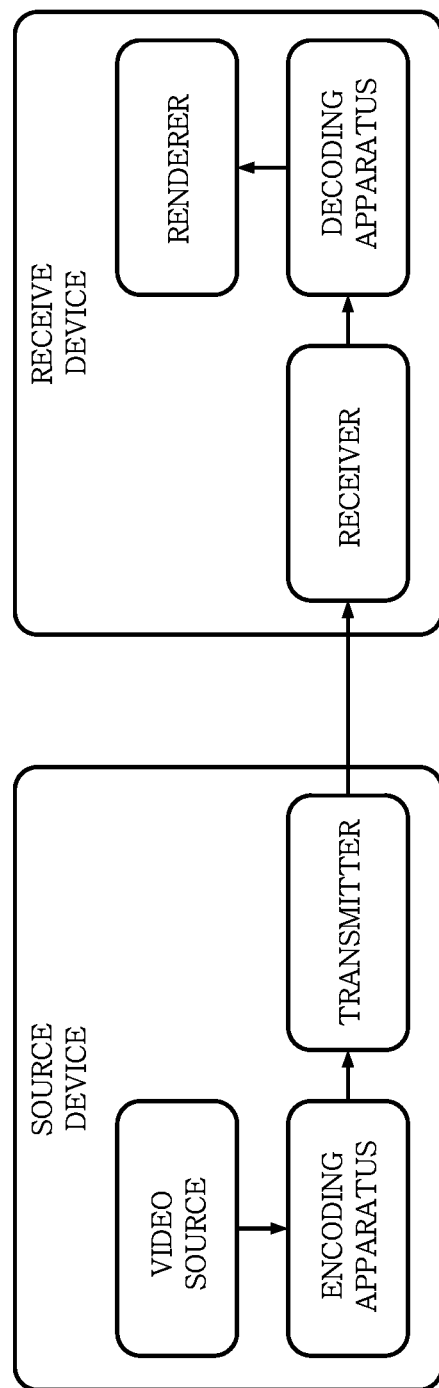
FIG. 1 schematically illustrates an example of a video/image coding system to which embodiments of this document may be applied.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Present disclosure relates to video/image coding. For example, the methods/embodiments disclosed in the present disclosure may be applied to a method disclosed in the versatile video coding (VVC) standard. In addition, the methods/embodiments disclosed in the present disclosure may be applied to a method disclosed in the essential video coding (EVC) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In the present disclosure, a video may mean a set of a series of images according to a passage of time. Generally, a picture means a unit that represents an image at a specific time zone, and a slice/tile is a unit that constitutes a part of a picture. A slice/tile may include one or more coding tree units (CTUs). One picture may include one or more slices/tiles.

A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice may include a plurality of consecutive CTU columns in a tile of a picture which may be included in a plurality of perfect tiles or one NAL unit. In the present disclosure, a tile group may be used interchangeably with a slice. For example, in the present disclosure, a tile group/tile group header may be called a slice/slice header.

Meanwhile, a picture may be distinguished by two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, "A or B" may mean "only A", "only B", or "both A and B." In other words, in the present disclosure, "A or B" may be interpreted as "A and/or B". For example, in the present disclosure, "A, B, or C" may mean "only A", "only B", "only C", or "any combination of A, B, and C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present specification, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)" it may mean that "intra prediction" is proposed as an example of the "prediction". In other words, the "prediction" of the present disclosure is not limited to "intra prediction", and "intra prediction" may be proposed as an example of the "prediction". In addition, when indicated as "prediction (i.e., intra prediction)", it may also mean that "intra prediction" is proposed as an example of the "prediction".

A technical feature described individually in one figure in the present disclosure may be individually implemented or may be simultaneously implemented.

Figure 2:
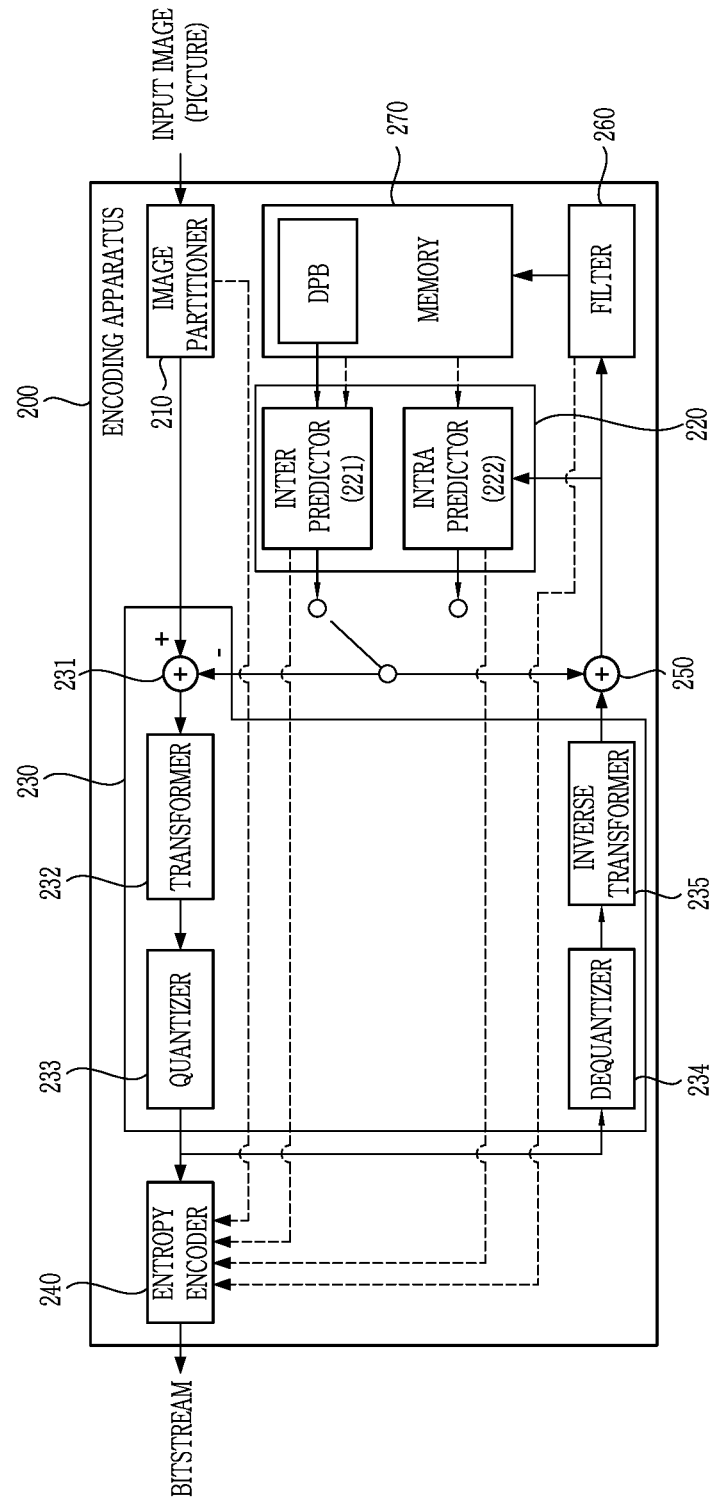
FIG. 2 is a schematic diagram illustrating a configuration of a video/image encoding apparatus to which the embodiment(s) of the present document may be applied.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Meanwhile, in the present disclosure, at least one of the quantization/dequantization and/or the transform/inverse transform may be omitted. When the quantization/dequantization is omitted, the quantized transform coefficient may be called a transform coefficient. When the transform/inverse transform is omitted, the transform coefficient may be called a coefficient or a residual coefficient or may still be called a transform coefficient for uniformity of expression.

In addition, in the present disclosure, a quantized transform coefficient and a transform coefficient may be referred to as a transform coefficient and a scaled transform coefficient, respectively. In this case, the residual information may include information on transform coefficient(s), and the information for the transform coefficient(s) may be signaled through residual coding syntax. Transform coefficients may be derived based on the residual information (or the information for the transform coefficient(s)), and scaled transform coefficients may be derived by inverse transforming (scaling) of the transform coefficients. Residual samples may be derived based on the inverse transforming (transforming) of the scaled transform coefficients. This may be applied/expressed in other parts of the present disclosure in the same manner.

Figure 3:
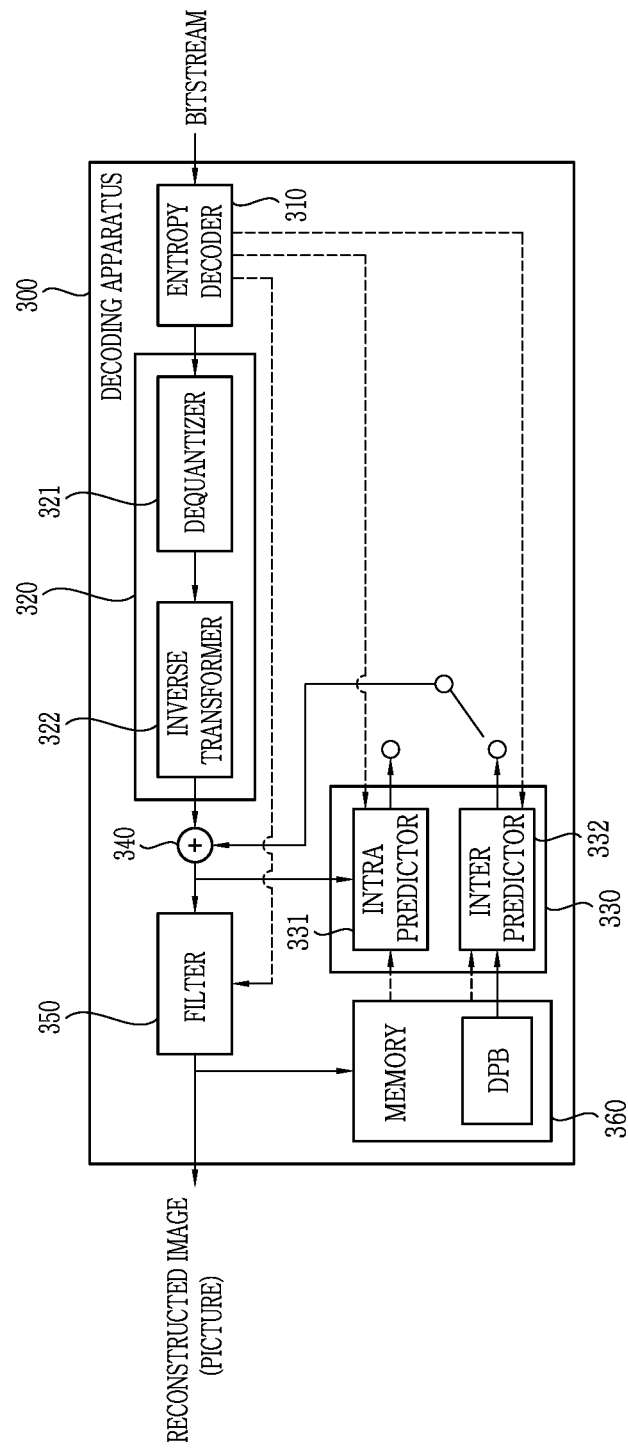
FIG. 3 is a schematic diagram illustrating a configuration of a video/image decoding apparatus to which the embodiment(s) of the present document may be applied.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Figure 4:
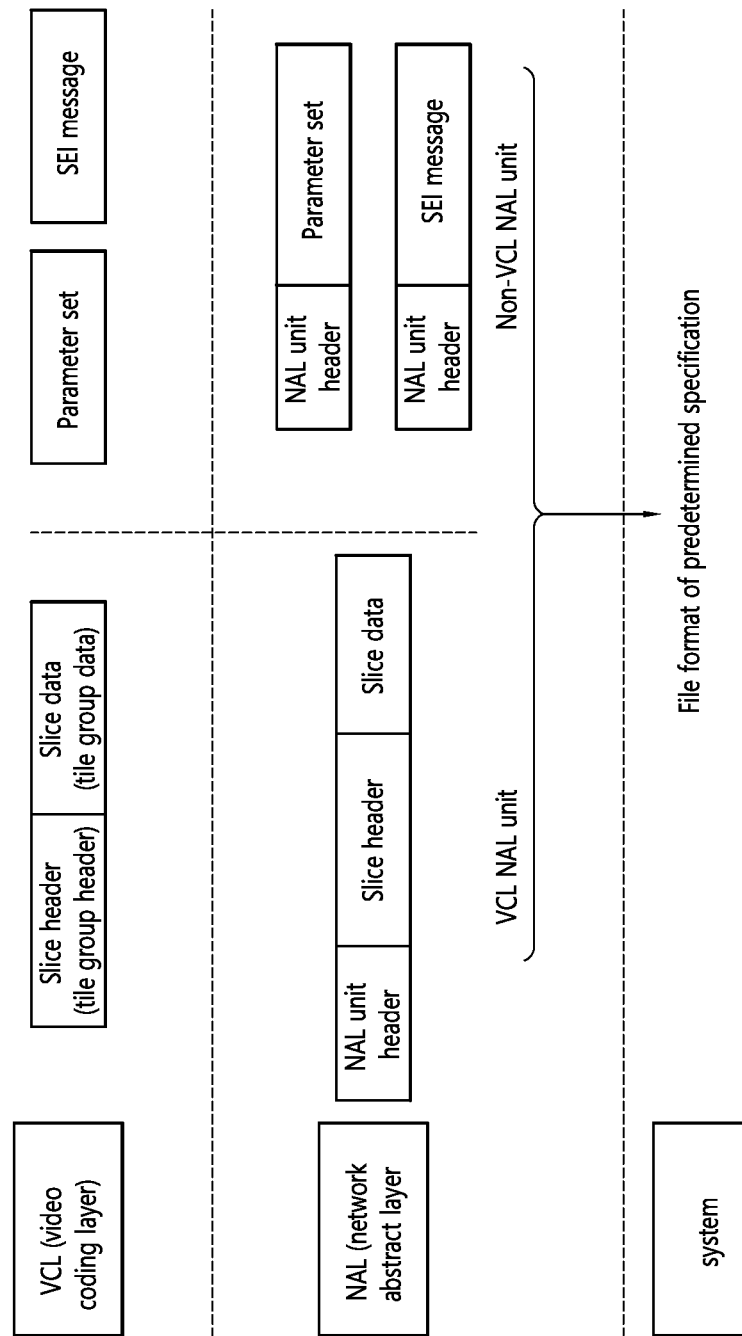
FIG. 4 illustrates an exemplary hierarchical structure for coded data.

FIG. 4 illustrates an exemplary hierarchical structure for coded data.

Referring to FIG. 4, coded data may be divided into a video coding layer (VCL) that handles coding processing of a video/image and the video/image itself and a network abstraction layer (NAL) that stores and transmits data of the coded video/image and being positioned between the video coding layer (VCL) and a lower system.

The VCL may generate a supplemental enhancement information (SEI) message which is supplementally required in the coding processing of a parameter set (a picture parameter set (PPS), a sequence parameter set (SPS), a video parameter set (VPS), etc.) corresponding to a header of a sequence and a picture, and a video/image. The SEI message is separated from information for the video/image (slice data). The VCL including the information for the video/image includes slice data and a slice header. Meanwhile, the slice header may be referred to as a tile group header, and the slice data may be referred to as tile group data.

In the NAL, a NAL unit may be generated by adding header information (NAL unit header) to a Raw Byte Sequence Payload (RBSP) generated in the VCL. In this case, the RBSP is referred to as slice data, a parameter set, an SEI message, and the like, which are generated in the VCL. The NAL unit header may include NAL unit type information which is specified according to RBSP data included in the NAL unit.

The NAL unit, which is a basic unit of the NAL, performs a function of mapping the coded image to a bit sequence of a lower system, such as a file format, a Real-time Transport Protocol (RTP), a Transport Stream (TS), and the like, according to a predetermined specification.

As shown in the drawing, the NAL unit may be divided into a VCL NAL unit and a non-VCL NAL unit according to the RBSP generated in the VCL. The VCL NAL unit may mean a NAL unit that includes information (slice data) for an image, and the non-VCL NAL unit may mean a NAL unit that includes information (parameter set or SEI message) required to decode an image.

The VCL NAL unit and the non-VCL NAL unit described above may be transmitted through a network by attaching header information according to the data specification of a lower system. For example, the NAL unit may be transformed into a data format of a predetermined specification such as H.266/VVC file format, RTP (Real-time Transport Protocol), TS (Transport Stream), and the like.

As described above, for the NAL unit, a NAL unit type may be specified according to an RBSP data structure included in the NAL unit, and the information for the NAL unit type may be stored in a NAL unit header and signaled.

For example, the NAL unit may be classified into a VCL NAL unit type and a non-VCL NAL unit type according to whether the NAL unit includes information (slice data) for an image. The VCL NAL unit type may be classified according to a property and type of a picture included in the VCL NAL unit, and the non-VCL NAL unit type may be classified according to a type of a parameter set.

An example of a NAL unit type is described below, which is specified according to a type of a parameter set included in the non-VCL NAL unit type. The NAL unit type may be specified according to a type of a parameter set. For example, the NAL unit type may be specified as one of an APS (Adaptation Parameter Set) NAL unit, which is a type for the NAL unit including an APS, a DPS (Decoding Parameter Set) NAL unit, which is a type for the NAL unit including a DPS, a VPS (Video Parameter Set) NAL unit, which is a type for the NAL unit including a VPS, an SPS (Sequence Parameter Set) NAL unit, which is a type for the NAL unit including an SPS, and a PPS (Picture Parameter Set) NAL unit, which is a type for the NAL unit including a PPS.

The NAL unit types described above may have syntax information for the NAL unit type, and the syntax information may be stored in a NAL unit header and signaled. For example, the syntax information may be nal_unit_type, and the NAL unit types may be specified as a nal_unit_type value.

Meanwhile, as described above, one picture may have a plurality of slices, and one slice may include a slice header and slice data. In this case, in addition to a plurality of slices (a set of slice header and slice data), one picture header may be further added in one picture. The picture header (picture header syntax) may include information/parameters which may be commonly applied to the picture. The slice header (slice header syntax) may include information/parameters which may be commonly applied to the slice. The APS (APS syntax) or the PPS (PPS syntax) may include information/parameters which may be commonly applied to one or more slices or the pictures. The SPS (SPS syntax) may include information/parameters which may be commonly applied to one or more sequence. The VPS (VPS syntax) may include information/parameters which may be commonly applied to multiple layers. The DPS (DPS syntax) may include information/parameters which may be commonly applied to an overall video. The DPS may include information/parameters related to a concatenation of a CVS (coded video sequence). In the present disclosure, a high level syntax (HLS) may include at least one of the APS syntax, the PPS syntax, the SPS syntax, the VPS syntax, the DPS syntax, a picture header syntax, or the slice header syntax.

In the present disclosure, the image/video information encoded from the encoding apparatus to the decoding apparatus and signaled in a bitstream format may include information included in the slice header, information included in the picture header, information included in the APS, information included in the PPS, information included in the SPS, information included in the VPS, and/or information included in the DPS as well as information related to partitioning in a picture, intra/inter prediction information, residual information, in-loop filtering information, and the like. In addition, the image/video information may further include information of the NAL unit header.

FIG. 5 is a diagram illustrating an example of partitioning a picture.

Pictures may be partitioned into coding tree units (CTUs), and a CTU may correspond to a coding tree block (CTB). A CTU may include a coding tree block of luma samples and corresponding two coding tree blocks of chroma samples. Meanwhile, the maximum available size of a CTU for coding and prediction may be different from the maximum available size of a CTU for transform.

A tile may correspond to a series of CTUs covering a rectangle area, and a picture may be partitioned into one or more tile rows and one or more tile columns.

Meanwhile, a slice may include the integer number of perfect tiles or the integer number of consecutive perfect CTU columns. In this case, two types of slice modes including a raster-scan slice mode and a rectangular slice mode may be supported.

In the raster-scan slice mode, a slice may include a series of perfect tiles in a tile raster scan of a picture. In the rectangular slice mode, a slice may include a plurality of perfect tiles that collectively forms a rectangular area of a picture. Alternatively, in the rectangular slice mode, a slice may include a plurality of consecutive CTU columns in a tile that collectively forms a rectangular area of a picture. Tiles in a rectangular slice may be scanned in a tile raster scan order in the rectangular area that corresponds to a corresponding slice.

Meanwhile, a subpicture may include one or more slices that cover a rectangular area of a picture.

FIG. 5(a) is a diagram illustrating an example in which a picture is partitioned into raster scan slices. For example, a picture may be partitioned into 12 tiles and 3 raster scan slices.

In addition, FIG. 5(b) is a diagram illustrating an example in which a picture is partitioned into rectangular slices. For example, a picture may be partitioned into 24 tiles (6 tile rows and 4 tile columns) and 9 rectangular slices.

Furthermore, FIG. 5(c) is a diagram illustrating an example in which a picture is partitioned into tiles and rectangular slices. For example, a picture may be partitioned into 24 tiles (2 tile rows and 2 tile columns) and 4 rectangular slices.

Figure 6:
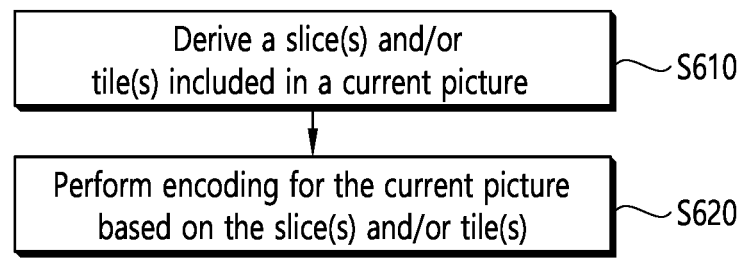
FIG. 6 is a flowchart illustrating a picture encoding procedure according to an embodiment.

FIG. 6 is a flowchart illustrating a picture encoding procedure according to an embodiment.

In one embodiment, a picture partitioning (step S600) may be performed by the image partitioner 210 of the encoding apparatus, and a picture encoding (step S610) may be performed by the entropy encoder 240 of the encoding apparatus.

The encoding apparatus according to an embodiment may derive a slice(s) and/or a tile(s) included in a current picture (step S600). For example, the encoding apparatus may perform the picture partitioning to encode an input current picture. For example, the encoding apparatus may derive a slice(s) and/or a tile(s) included in the current picture. The encoding apparatus may partition a picture in various formats by considering an image property and coding efficiency of the current picture and generate information representing a partitioning format having the optimal coding efficiency, and then, may signal the information to the decoding apparatus.

The encoding apparatus according to an embodiment may perform encoding for the current picture based on the derived slice(s) and/or tile(s) (step S610). For example, the encoding apparatus may encode video/image information including information for the slice(s) and/or tile(s) and output the information in a bitstream format. The output bitstream may be forwarded to the decoding apparatus through a digital storage medium or a network.

Figure 7:
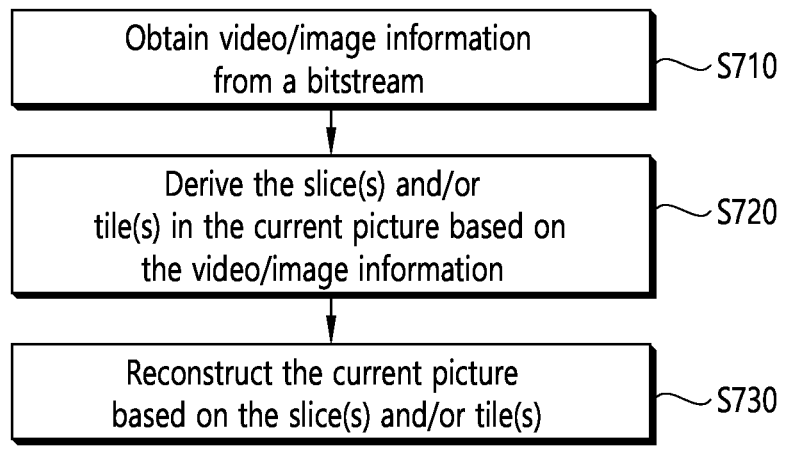
FIG. 7 is a flowchart illustrating a picture decoding procedure according to an embodiment.

FIG. 7 is a flowchart illustrating a picture decoding procedure according to an embodiment.

In one embodiment, a step of obtaining video/image information from a bitstream (step S710) and a step of deriving a slice(s) and/or a tile(s) in a current picture (step S720) may be performed by the entropy decoder 310 of the decoding apparatus, and a step of reconstructing a current picture based on the slice(s) and/or tile(s) may be performed by the adder 340 of the decoding apparatus.

The decoding apparatus according to an embodiment may obtain video/image information from a received bitstream (step S710). The video/image information may include an HLS, and the HLS may include information for the slice(s) or information for the tile(s). The information for the slice(s) may include information for specifying one or more slices in the current picture, and the information for the tile(s) may include information for specifying one or more tiles in the current picture. The information for the slice(s) or the information for the tile(s) may be obtained through various parameter sets, a picture header, and/or a slice header.

Meanwhile, the current picture may include a tile including one or more slices or a slice including one or more tiles.

The decoding apparatus according to an embodiment may derive the slice(s) and/or tile(s) in the current picture based on the video/image information including the information for the slice(s) and/or tile(s) (step S720).

The decoding apparatus according to an embodiment may reconstruct (decode) the current picture based on the slice(s) and/or tile(s) (step S730).

Figure 8:
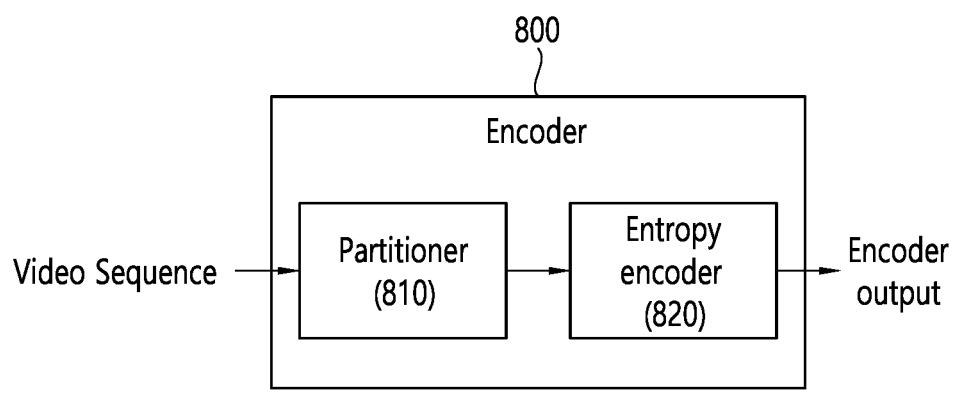
FIG. 8 is a block diagram illustrating a configuration of the encoding apparatus according to an embodiment.
Figure 9:
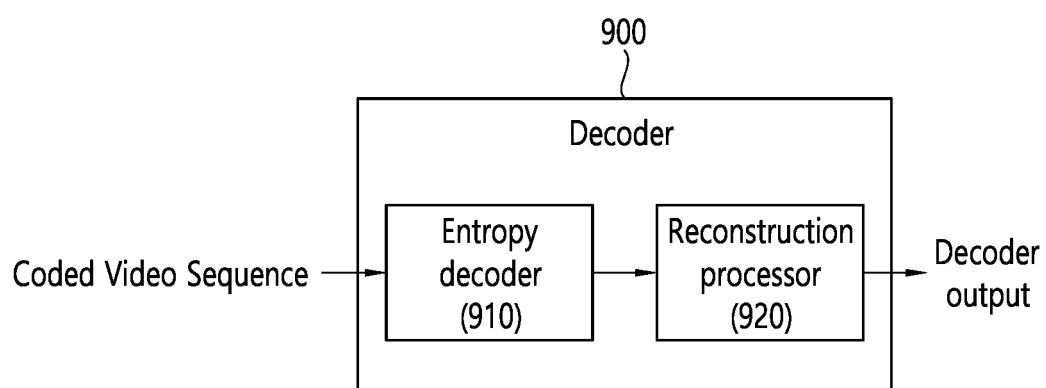
FIG. 9 is a block diagram illustrating a configuration of the decoding apparatus according to an embodiment.

FIG. 8 is a block diagram illustrating a configuration of the encoding apparatus according to an embodiment, and FIG. 9 is a block diagram illustrating a configuration of the decoding apparatus according to an embodiment.

FIG. 8 shows an example of a block diagram of the encoding apparatus. The encoding apparatus 800 shown in FIG. 8 includes a partitioner 810 and an entropy encoder 820. The partitioner 810 may perform the same and/or similar operations of the image partitioner 210 of the encoding apparatus shown in FIG. 2, and the entropy encoder 820 may perform the same and/or similar operations of the entropy encoder 240 of the encoding apparatus shown in FIG. 2. For example, the partitioner 810 may derive at least one slice and/or at least one tile included in a current picture. For example, the encoding apparatus may perform picture partitioning for encoding of an input current picture. An input video may be partitioned in the partitioner 810 and may be encoded in the entropy encoder 820. After encoding, the encoded video may be output from the encoding apparatus 800.

FIG. 9 shows an example of a block diagram of the decoding apparatus. The decoding apparatus 900 shown in FIG. 9 includes an entropy decoder 910 and a reconstruction processor 920. The entropy decoder 910 may perform the same and/or similar operations of the entropy decoder 310 of the encoding apparatus shown in FIG. 3. The reconstruction processor 920 may include at least one of the components except the entropy decoder 310 shown in FIG. 3 described above. The entropy decoder 910 may decode an input received from the encoding apparatus 800 and derive information for tiles. A processing unit may be determined based on the decoded information, and the reconstruction processor 920 may perform decoding based on the processing unit and may generate reconstructed samples.

Meanwhile, as described above, a picture may be partitioned into subpictures, tiles, and slices. The information for the subpicture may be signaled through an SPS, and the information for tile and rectangular slices may be signaled through a PPS. In addition, the information for a raster-scan slice may be signaled through a slice header.

For example, the SPS syntax including the information for the subpicture may be represented as shown in the following table.

TABLE 1

| | Descriptor |
|---|---|
| seq_parameter_set_rbsp() { | |
| ... | |
| subpics_present_flag | u(1) |
| iff subpics_present_flag ) { | |
| sps_num_subpics_minus1 | u(8) |
| for( i = 0; i <= sps_num_subpics_minus1; i++ ) { | |
| subpic_ctu_top_left_x[ i ] | u(v) |
| subpic_ctu_top_left_y[ i ] | u(v) |
| subpic_width_minus1[ i ] | u(v) |
| subpic _height_minus1[ i ] | u(v) |
| subpic_treated_as_pic_flag[ i ] | u(1) |
| loop_filfer_across_subpic_enabled_flag[ i ] | u(1) |

TABLE 1-continued

| | Descriptor |
|---|---|
| } | |
| } | |
| ... | |
| } | |

For example, the PPS syntax including the information for the tile and rectangular slices may be represented as shown in the following table.

TABLE 2

| | Descriptor |
|---|---|
| pic_parameter_set_rbsp( ) { | |
| ... | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; 1 <= num_exp_tile_columns_minus1; i++ ) | |
| tile_column_width_minus1[ i ] | ue(v) |
| for( i = 0: <= num_exp_tile_rows_minus1; i++ ) | |
| tile_row_height_minus1[ i ] | ue(v) |
| rect_slice_flag | u(1) |
| if( rect_slice_flag ) | |
| single_slice_per_subpic_flag | u(1) |
| if(rect_slice_flag && !single_slice_per_subpic_flag) { | |
| num_slices_in_pic_minus1 | ue(v) |
| tile_idx_delta_present_flag | u(1) |
| for( i = 0; 1 < num_slices_in_pic_minus1; i++ } { | |
| slice_width_in_tiles_minus1[ i ] | ue(v) |
| slice_heigh_in_tiles_minus1[ i ] | ue(v) |
| if( slice_width_in_tiles_minus1[i] = = 0 && | |
| slice_height_in_tiles_minis1[i] = = 0) { | |
| num_slices_in_tile_minus1[ i] | ue(v) |
| numSlicesInTileMinus1 = num_slices_in_tile_minus1[ i ] | |
| for( j = 0; j < numSlicesInTileMinus1; j++ ) | |
| slice_height_in_ctu_minus1[ i++ ] | ue(v) |
| } | |
| if( tile_idx_delta_present_flag && i < num_slices_in_pic_minus1 ) | |
| tile_idx_delta[i] | se(v) |
| } | |
| } | |
| loop_filter_across_tiles_enabled_flag | u(1) |
| loop_filter_across_slices_enabled_flag | u(1) |
| } | |
| ... | |
| } | |

In addition, for example, the slice header syntax including the information for a raster-scan slice may be represented as shown in the following table.

TABLE 3

| | Descriptor |
|---|---|
| slice_header( ) { | |
| ... | |
| if(rect_slice_flag | | NumTilesinPic > 1) | |
| slice_address | u(v) |
| if( !rect_slice_flag && NumTilesInPic > 1) | |
| num_tiles_in_slice_minus1 | ue(v) |
| ... | |
| } | |

Meanwhile, the information for the slice(s) in the current picture and the information for the tile(s) may include a flag related to whether each subpicture in the current picture includes a single slice. The flag may be referred to as single_slice_per_subpic_flag or pps_single_slice_per_subpic_flag, but may not be limited thereto. In addition, the information for the subpicture may include a flag related to the presence of subpicture information, and the flag may be referred to as subpics_present_flag or sps_subpic_info_present_flag, but may not be limited thereto. For example, the information for the subpicture may be included in a parameter set. For example, the information for the subpicture may be included in the SPS.

Conventionally, in the case that a value of the flag related to the presence of the subpicture information is zero, the value of the flag is restricted such that a value of the flag related to whether a subpicture includes only one slice becomes zero. That is, in the case that a value of the flag related to the presence of the subpicture information is zero, the subpicture is determined to be unavailable, and a value of the flag related to whether a subpicture includes only one slice is restricted to zero. However, the condition is very restrictive. For example, even in the case that subpicture information is not present, the current picture may be partitioned into two or more tiles, and all tiles may be included in a single slice. In this case, the current picture includes only one slice.

Therefore, an embodiment of the present disclosure proposes, a method of removing the restriction that a value of the flag related to whether a subpicture includes only one slice becomes zero in the case that a value of the flag related to the presence of the subpicture information is zero. In this case, the flag related to whether a subpicture includes only one slice may indicate the case that the current picture includes only one slice even in the case that the subpicture information is not present.

For example, according to the embodiment, even in the case that the subpicture information is not present for a coded layer video sequence (CLVS), the flag related to whether a subpicture includes only one slice may be present. That is, even in the case that the subpicture information is not present for the CLVS, the flag related to whether a subpicture includes only one slice may have a value of zero or 1.

For example, in the case that a value of the flag related to the presence of the subpicture information is zero and a value of the flag related to whether a subpicture includes only one slice is 1, the current picture may include only one slice. That is, in the case that there is no signaled subpicture and a value of the flag related to whether a subpicture includes only one slice is 1, the number of slices in a picture may be inferred to be 1.

In addition, in the case that a value of the flag related to the presence of the subpicture information is zero, the number of subpictures in the current picture may be 1. For example, in the case that a value of the flag related to the presence of the subpicture information is zero, the number of subpictures present in each of all pictures that refer to an SPS of image information may be 1.

Meanwhile, a flag related to the number of slices included in the current picture may be included in a PPS of image information. The flag related to the number of slices included in the current picture may be referred to as num_slices_in_pic_minus1 or pps_num_slices_in_pic_minus1, but may not be limited thereto. In addition, a flag related to the number of subpictures included in the current picture may be included in an SPS of image information. The flag related to the number of subpictures included in the current picture may be referred to as sps_num_subpics_minus1, but may not be limited thereto.

In the case that subpicture information is not present and a value of the flag related to whether a subpicture includes only one slice is 1, the flag related to the number of slices included in the current picture may be inferred to have a value of zero. In addition, in the case that subpicture information is not present and a value of the flag related to whether a subpicture includes only one slice is 1, the flag related to the number of slices included in the current picture and the flag related to the number of subpictures included in the current picture may be inferred to have the same value.

In addition, in the case that a value of the flag related to whether a subpicture includes only one slice is 1, all CTUs in a picture may belong to the only one slice included in the picture.

The semantics for the syntax element including the flag related to whether a subpicture includes only one slice and the flag related to the number of slices included in the current picture may be represented as shown in the following table.

TABLE 4 single_slice_per_subpic_flag equal to 1 specifies that each subpicture consists of one and only one rectangular slice. single_slice_per_subpic_flag equal to 0 specifies that each subpicture may consist one or more rectangular slices. When single_slice_per_subpic_flag is equal to 1, num_slices_in_pic_minus1 is inferred to be equal to sps_num_subpics_minus1.
  Note: when single_slice_per_subpic_flag is equal to 1 and subpics_present_flag is equal to 0, the pictures referring to the PPS have one slice per picture.
num_slices_in_pic_minus1 plus 1 specifies the number of rectangular slices in each picture referring to the PPS. The value of num_slices_in_pic_minus1 shall be in the range of 0 to MaxSlicesPerPicture − 1, inclusive, where MaxSlicesPerPicture is specified in Annex A. When no_pic_partition_flag is equal to 1, the value of num_slices_in_pic_minus 1 is inferred to be equal to 0.

Referring to the table above, in the case that a value of single_slice_per_subpic_flag that corresponds to the flag related to whether a subpicture includes only one slice is 1, each subpicture may include a single rectangular slice. In addition, in the case that a value of single_slice_per_subpic_flag is zero, each subpicture may include one or more rectangular slices. In the case that a value of single_slice_per_subpic_flag is 1, a value of num_slices_in_pic_minus1 that corresponds to the flag related to the number of slices included in the current picture may be inferred to have the same value as a value of sps_num_subpics_minus1 that corresponds to the flag related to the number of subpictures included in the current picture.

Furthermore, in the case that a value of single_slice_per_subpic_flag is 1 and a value of subpics_present_flag that corresponds to the flag related to the presence of the subpicture information is zero, a picture that refers to a PPS may have a single slice per picture.

Meanwhile, a scanning process which is an order of decoding tiles in a picture may be determined according to the following table.

TABLE 5

For rectangular slices, the list: NumCtuInSlice[ i ] for i ranging from 0 to num_slices_in_pic
_minus1, inclusive, specifying the number of CTU in the i-th slice, and the matrix CtbAdd
rInSlice[ i ][ j ] for i ranging from 0 to num_slices_in_pic_minus1, inclusive, and j ranging f
rom 0 to NumCtuInSlice[ i ] – 1, inclusive, specifying tie picture raster scan address of the
j-th CTB within the i-th slice, are derived as follows:
```
if( single_slice_per_subpic_flag ) {
   for( i = 0; i <= sps_num_subpics_minus1; i++ )
      NumCtuInSlice[ i ] = 0
   for( i = 0; i < PicSizeInCtbsY; i ++ ) {
      sliceIdx = CtbToSubPicIdx[ i ]
      CtbAddrInSlice[ sliceIdx ][ NumCtuInSlice[ sliceIdx ] ] = i
      NumCtuInSlice[ sliceIdx ]++
   }
} else {
   tileIdx = 0
   for i = 0; i <= num_slices_in_pic_minus1; i++ )
      NumCtuInSlice[ i ] = 0
   for( i = 0; i <= num_slices_in_pic_minus1; i++ ) {
      tileX = tileIdx % NumTileColumns
      tileY = tileIdx / NumTileColumns
      if( i = = num_slices_in_pic_minus1 ) {
         slice_width_in_tiles_minus1[ i ] = NumTileColumns – 1 – tileX
         slice_height_in_tiles_minus1[ i ] = NumTileRows – 1 – tileY
         num_slices_in_tile_minus1[ i ] = 0
      }
      if( slice_width_in_tiles_minus1[ i ] = = 0 && slice_height_in_tiles_minus1
[ i ] = = 0 ) {                                    (29)
         ctbY = tileRowBd[ tileY ]
         numSlicesInTileMinus1 = num_slices_in_tile_minus1[ i ]
         for j = 0; j < numSlicesInTileMinus1; j++ ) {
            AddCtbsToSlice( i, tileColBd[ tilex ], tileColBd[ tileX + 1 ],
               ctbY, ctbY + slice_height_in_ctu_minus1[ i ] + 1 )
            ctbY += slice_height_in_ctu_minus1[ i ] + 1
            i++
         }
         AddCtbsToSlice( i, tileColBd[ tileX ], tileColBd[ tileX + 1 ], ctbY, tileRowB
d[ tileY + 1 ] )
      } else
         for j = 0; j: <= slice_height_in_tiles_minus1[ i ] j++ )
            for k = 0; k <= slice_width_in_tiles_minus1[ i ]; k++ )
               AddCtbsToSlice( i, tileColBd[ tileX + k ], tileColBd[ tileX + k + 1 ],
                  tileRowBd[ tileY + j ], tileRowBd[ tileY + j + 1 ] )
      if tile_idx_delta_present_flag )
         tileIdx += tile_idx_delta[ i ]
      else {
         tileIdx += slice_width_in_tiles_minus1[ i ] + 1
         if( tileIdx % NumTileColumns = = 0 )
            tileIdx += slice_height_in_tiles _minus1[ i ] * NumTileColumns
      }
   }
}
```

Figure 10:
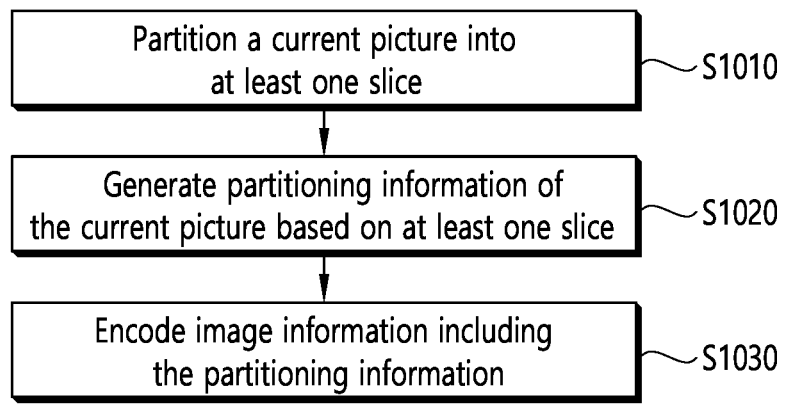
FIG. 10 is a flowchart illustrating an operation of the encoding apparatus according to an embodiment.
Figure 11:
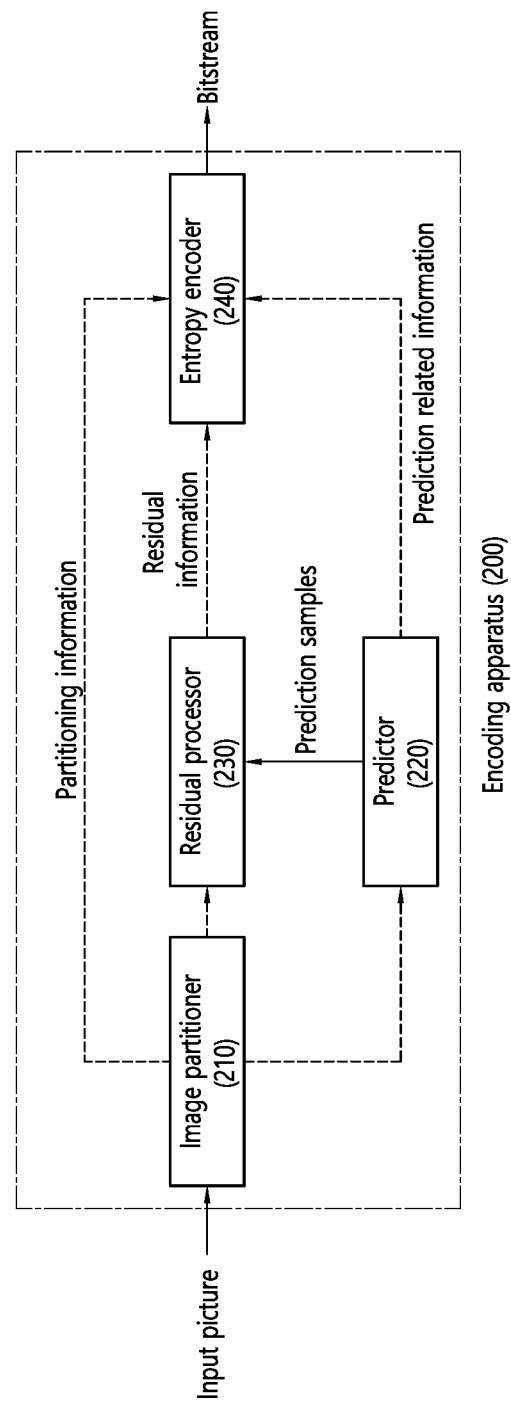
FIG. 11 is a block diagram illustrating a configuration of the encoding apparatus according to an embodiment.

FIG. 10 is a flowchart illustrating an operation of the encoding apparatus according to an embodiment, and FIG. 11 is a block diagram illustrating a configuration of the encoding apparatus according to an embodiment.

The method shown in FIG. 10 may be performed by the encoding apparatus shown in FIG. 2 or FIG. 11. Steps S1010 and S1020 shown in FIG. 10 may be performed by the image partitioner 210 shown in FIG. 2, and step S1030 may be performed by the entropy encoder 240 shown in FIG. 2. Furthermore, the operations according to steps S810 to S830 are based on a part of the description described with referring to FIG. 1 to FIG. 9. Accordingly, the detailed description overlapped with the description described with referring to FIG. 1 to FIG. 9 is omitted or briefly described.

Referring to FIG. 10, the encoding apparatus according to an embodiment may partition a current picture into at least one slice (step S1010). For example, the encoding apparatus may derive at least one slice and/or at least one tile included in the current picture. For example, the encoding apparatus may perform a picture partitioning to encode an input current picture.

The encoding apparatus according to an embodiment may generate partitioning information of the current picture based on at least one slice (step S1020). For example, the image partitioner 210 of the encoding apparatus may generate the partitioning information for the current picture based on at least one slice and/or at least one tile.

The encoding apparatus according to an embodiment may encode image information including the partitioning information (step S1030). For example, the image information may include at least one of the partitioning information for the current picture or the prediction information for the current block. Alternatively, the image information may include prediction samples derived by the predictor 220 of the encoding apparatus and residual information generated from original samples in the residual processor 230 of the encoding apparatus.

For example, the image information may include a first flag related to the presence of subpicture information and a second flag related to whether the subpicture includes only one slice. For example, a value of the first flag may correspond to zero, and a value of the second flag may correspond to 1.

For example, in the case that a value of the first flag related to the presence of the subpicture information is zero and a value of the second flag is 1, the number of slices included in the current picture may be derived to be equal to 1.

For example, in the case that a value of the first flag related to the presence of the subpicture information is zero, the number of subpictures present in the current picture may be 1.

For example, the first flag related to the presence of the subpicture information may be included in the SPS (Sequence Parameter Set) of the image information.

For example, the second flag related to whether the subpicture includes only one slice may be included in the PPS (Picture Parameter Set) of the image information.

For example, the image information may include a third flag related to the number of slices included in the current picture, and the third flag may be included in the PPS of the image information.

In addition, for example, the image information may include a fourth flag related to the number of subpictures included in the current picture, and the fourth flag may be included in the SPS of the image information.

In addition, for example, in the case that a value of the first flag is zero, the number of subpictures present in each of all pictures that refer to the SPS of the image information may be derived to be equal to 1.

Meanwhile, the image information may include prediction information for the current picture. The prediction information may include information for an inter prediction mode or an intra prediction mode performed in the current picture. The encoding apparatus may generate and encode the prediction information for the current picture.

Meanwhile, the bitstream may be transmitted to the decoding apparatus through a network or a (digital) storage medium. Here, the network may include a broadcasting network and/or a communication network. The digital storage medium may include various storage media such as USB, SD, CD, DVD, Blu-ray, HDD, SSD, and the like.

Figure 12:
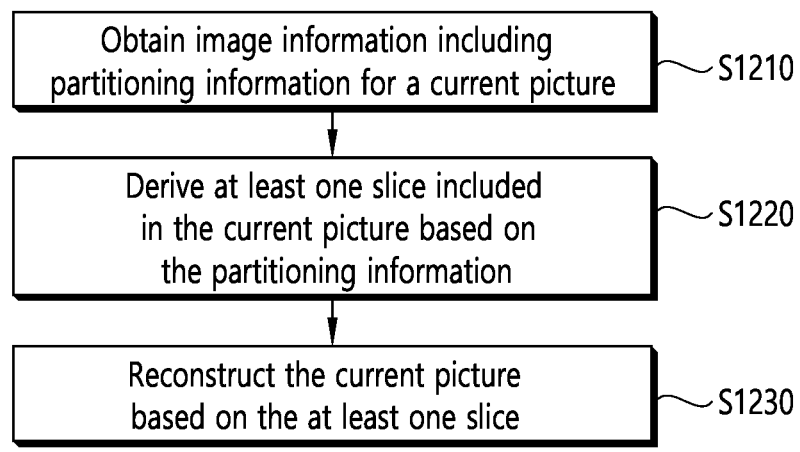
FIG. 12 is a flowchart illustrating an operation of the decoding apparatus according to an embodiment.
Figure 13:
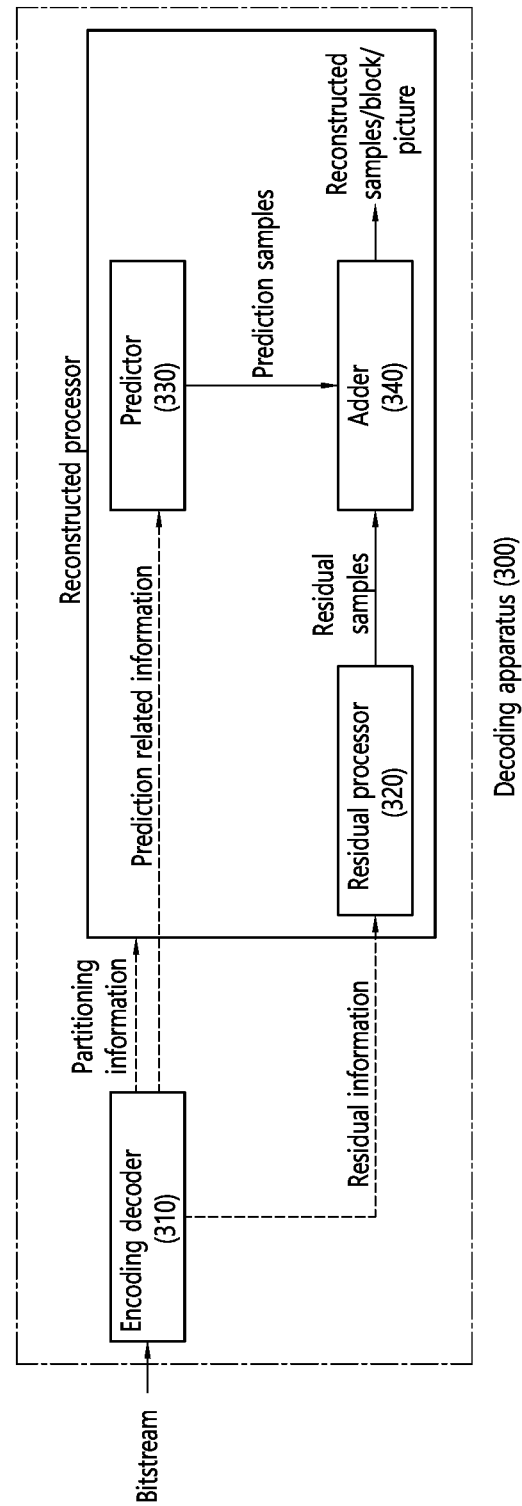
FIG. 13 is a block diagram illustrating a configuration of the decoding apparatus according to an embodiment.

FIG. 12 is a flowchart illustrating an operation of the decoding apparatus according to an embodiment, and FIG. 13 is a block diagram illustrating a configuration of the decoding apparatus according to an embodiment.

The method shown in FIG. 12 may be performed by the decoding apparatus shown in FIG. 3 or FIG. 13. Steps S1210 and S1220 may be performed by the entropy decoder 310 shown in FIG. 3. In addition, step S1230 may be performed by the entropy adder 340 shown in FIG. 3. Furthermore, the operations according to steps S1210 to S1230 are based on a part of the description described with referring to FIG. 1 to FIG. 9. Accordingly, the detailed description overlapped with the description described with referring to FIG. 1 to FIG. 9 is omitted or briefly described.

The decoding apparatus according to an embodiment may obtain image information including partitioning information for a current picture from a bitstream (step S1210). For example, the entropy decoder 310 of the decoding apparatus may obtain the image information including the partitioning information for the current picture from a bitstream. For example, the partitioning information may include slice information and/or tile information for the current picture.

The slice information may include at least one slice included in the current picture, and the tile information may include at least one tile included in the current picture.

Furthermore, the image information may include at least a part of prediction related information or residual related information. For example, the prediction related information may include inter prediction mode information or inter prediction type information.

The decoding apparatus according to an embodiment may derive at least one slice based on the partitioning information (step S1220). For example, the entropy decoder 310 of the decoding apparatus may derive at least one slice included in the current picture based on the slice information included in the partitioning information. For example, the entropy decoder 310 of the decoding apparatus may derive a partitioning structure of the current picture based on the slice information for the current picture.

The decoding apparatus according to an embodiment may reconstruct the current picture based on at least one slice (step S1230). For example, the entropy decoder 310 of the decoding apparatus may generate a reconstructed block or a reconstructed picture based on the at least one slice. For example, the decoding apparatus may derive prediction samples by performing an inter prediction mode or an intra prediction mode for the current picture and generate a reconstructed block through an addition of the prediction sample and the residual sample.

For example, the image information may include a first flag related to the presence of subpicture information and a second flag related to whether the subpicture includes only one slice. For example, a value of the first flag may correspond to zero and a value of the second flag may correspond to 1.

For example, in the case that a value of the first flag is zero and a value of the second flag is 1, the number of slices included in the current picture may be derived to be equal to 1.

For example, in the case that a value of the flag related to the presence of subpicture information is zero, the number of subpictures present in the current picture may be 1, For example, the first flag related to the presence of the subpicture information may be included in the SPS (Sequence Parameter Set) of the image information.

For example, the second flag related to whether the subpicture includes only one slice may be included in the PPS (Picture Parameter Set) of the image information.

For example, the image information may include a third flag related to the number of slices included in the current picture, and the third flag may be included in the PPS of the image information.

In addition, for example, the image information may include a fourth flag related to the number of subpictures included in the current picture, and the flag related to the number of subpictures included in the current picture may be included in the SPS of the image information.

In addition, for example, in the case that a value of the first flag is zero, the number of subpictures present in each of all pictures that refer to the SPS of the image information may be derived to be equal to 1.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (e.g., information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 14:
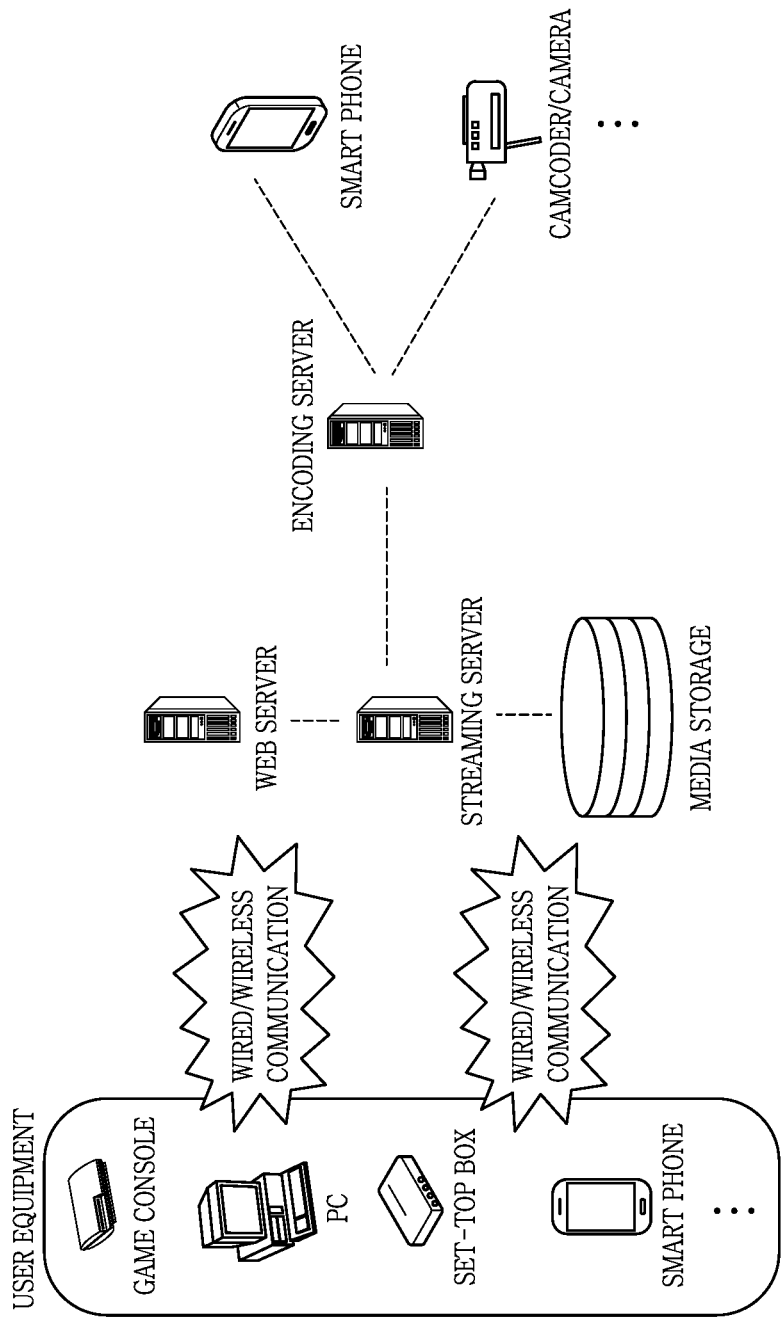
FIG. 14 illustrates an example of a content streaming system to which embodiments disclosed in this document may be applied.

FIG. 14 illustrates an example of a content streaming system to which embodiments disclosed in this document may be applied.

Referring to FIG. 14, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the method comprising:

receiving a bitstream including image information, wherein the image information includes partitioning information on a current picture;

deriving at least one slice included in the current picture based on the partitioning information; and reconstructing the current picture based on the at least one slice, wherein the image information includes a first flag related to the presence of subpicture information and a second flag related to whether each subpicture includes only one slice, wherein a value of the first flag is determined to be equal to 0 and a value of the second flag is determined to equal to 1 at the same time for the current picture, wherein based on the value of the first flag being equal to 0 and the value of the second flag being equal to 1, a number of slices included in the current picture is equal to a number of subpictures present in the current picture, wherein the first flag is included in a Sequence Parameter Set (SPS) of the image information, and wherein a number of CTU in a slice is determined based on the value of the second flag.

2. An image encoding method performed by an encoding apparatus, the method comprising:

deriving at least one slice by partitioning a current picture;

generating partitioning information of the current picture based on the at least one slice; and encoding image information for the current picture including the partitioning information, wherein the image information includes a first flag related to the presence of subpicture information and a second flag related to whether each subpicture includes only one slice, wherein a value of the first flag is determined to be equal to 0 and a value of the second flag is determined to equal to 1 at the same time for the current picture, wherein based on the value of the first flag being equal to 0 and the value of the second flag being equal to 1, a number of slices included in the current picture is equal to a number of subpictures present in the current picture, wherein the first flag is included in a Sequence Parameter Set (SPS) of the image information, and wherein a number of CTU in a slice is configured to be determined based on the value of the second flag.

3. A transmission method of data for image, the transmission method comprising:

generating a bitstream by a method, wherein the method comprising deriving at least one slice by partitioning a current picture, generating partitioning information of the current picture based on the at least one slice and generating the bitstream by encoding image information for the current picture including the partitioning information; and transmitting the data comprising the bitstream, wherein the image information includes a first flag related to the presence of subpicture information and a second flag related to whether each subpicture includes only one slice, wherein a value of the first flag is determined to be equal to 0 and a value of the second flag is determined to equal to 1 at the same time for the current picture, wherein based on the value of the first flag being equal to 0 and the value of the second flag being equal to 1, a number of slices included in the current picture is equal to a number of subpictures present in the current picture, wherein the first flag is included in a Sequence Parameter Set (SPS) of the image information, and wherein a number of CTU in a slice is configured to be determined based on the value of the second flag.

* * * * *